United States Patent
Dickinson et al.

(10) Patent No.: US 10,254,901 B2
(45) Date of Patent: Apr. 9, 2019

(54) METHOD AND INTEGRATED CIRCUIT TO GENERATE A SIGNAL TO OPERATE A SENSOR ARRAY

(71) Applicant: QUALCOMM Incorporated, San Diego, CA (US)

(72) Inventors: Timothy Dickinson, Carlsbad, CA (US); Lennart Karl-Axel Mathe, San Diego, CA (US); Scott McCarthy, San Diego, CA (US); Kostadin Dimitrov Djordjev, San Jose, CA (US); Louis Dominic Oliveira, San Diego, CA (US); Qubo Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/332,267

(22) Filed: Jul. 15, 2014

(65) Prior Publication Data

US 2015/0015515 A1    Jan. 15, 2015

Related U.S. Application Data

(60) Provisional application No. 61/846,585, filed on Jul. 15, 2013, provisional application No. 61/846,592, (Continued)

(51) Int. Cl.
*G06F 3/043* (2006.01)
*G01H 1/04* (2006.01)
(Continued)

(52) U.S. Cl.
CPC ............. *G06F 3/043* (2013.01); *G01H 1/04* (2013.01); *G01S 15/02* (2013.01); *G06F 3/0416* (2013.01); *G06F 3/0436* (2013.01)

(58) Field of Classification Search
CPC ...... G06F 3/043; G06F 3/0436; G06F 3/0416; G01H 1/04; G01S 15/02
See application file for complete search history.

(56) References Cited

U.S. PATENT DOCUMENTS

| 2,994,060 | A | 7/1961 | Ross |
| 5,610,629 | A | 3/1997 | Baur |

(Continued)

FOREIGN PATENT DOCUMENTS

| CN | 101512467 A | 8/2009 |
| JP | 2011234073 A | 11/2011 |

OTHER PUBLICATIONS

Wodnicki, R., et al., "Highly Integrated Large Area Ultrasound Arrays," Joint AAPM/COMP Meeting Vancouver Powerpoint Slides, 2011, The American Assoication of Physicists in Medicine and the Canadian Organization of Medical Physicists, pp. 1-3.

(Continued)

*Primary Examiner* — Temesghen Ghebretinsae
*Assistant Examiner* — Yaron Cohen
(74) *Attorney, Agent, or Firm* — QUALCOMM Incorporated

(57) ABSTRACT

An apparatus includes an integrated circuit configured to be operatively coupled to a sensor array that is configured to generate an ultrasonic wave. The integrated circuit includes a transmitter circuit configured to provide a first signal to the sensor array. The integrated circuit further includes a receiver circuit configured to receive a second signal from the sensor array in response to providing the first signal. The sensor array includes an ultrasonic transmitter configured to generate the ultrasonic wave in response to the first signal and a piezoelectric receiver layer configured to detect a reflection of the ultrasonic wave.

16 Claims, 10 Drawing Sheets

Related U.S. Application Data filed on Jul. 15, 2013, provisional application No. 61/846,604, filed on Jul. 15, 2013.

(51) Int. Cl.
  *G01S 15/02* (2006.01)
  *G06F 3/041* (2006.01)

(56) References Cited

U.S. PATENT DOCUMENTS

| | | | |
|---|---|---|---|
| 8,269,752 | B2 | 9/2012 | Takahashi et al. |
| 8,599,175 | B2 | 12/2013 | Iwata et al. |
| 8,605,042 | B2 | 12/2013 | Jang et al. |
| 8,959,003 | B2 | 2/2015 | Brugler et al. |
| 9,063,619 | B2 | 6/2015 | Yang |
| 2005/0215909 | A1 | 9/2005 | Barnes |
| 2005/0253858 | A1* | 11/2005 | Ohkami ............ G06F 12/0862 345/531 |
| 2006/0181524 | A1 | 8/2006 | Nakazawa et al. |
| 2009/0143106 | A1* | 6/2009 | Meitzler ............ H04M 1/72527 455/566 |
| 2009/0267928 | A1* | 10/2009 | Fryer ................ G09G 3/20 345/211 |
| 2010/0188371 | A1* | 7/2010 | Lowles ............. G06F 3/04886 345/178 |
| 2010/0268089 | A1 | 10/2010 | Degertekin |
| 2011/0254762 | A1 | 10/2011 | Dahl et al. |
| 2011/0263982 | A1 | 10/2011 | Kano |
| 2011/0279410 | A1 | 11/2011 | Han et al. |
| 2011/0279662 | A1 | 11/2011 | Schneider et al. |
| 2011/0292020 | A1* | 12/2011 | Lee ................. G09G 3/3688 345/211 |
| 2012/0111119 | A1* | 5/2012 | Small ............... G06F 3/0412 73/633 |
| 2012/0269031 | A1 | 10/2012 | Huffman et al. |
| 2012/0274609 | A1 | 11/2012 | Sheng et al. |
| 2013/0135248 | A1 | 5/2013 | Yang |
| 2013/0141344 | A1 | 6/2013 | Oh |
| 2013/0235698 | A1 | 9/2013 | Wong et al. |
| 2014/0092068 | A1 | 4/2014 | Zheng et al. |
| 2014/0198072 | A1 | 7/2014 | Schuele et al. |
| 2015/0016223 | A1 | 1/2015 | Dickinson et al. |

OTHER PUBLICATIONS

Beutel, J., et al., "Handbook of Medical Imaging: Physics and psychophysics," Flat-pannel array technology, 2000, vol. 2, SPIE Press, Bellingham Washington, p. 267.

Kim, I., et al., "Portable High-Frequency Ultrasound Imaging System Design and Hardware Considerations," Integrated Microsystems: Electronics, Photonics, and Biotechnology, 2011, CRC press, Boca Raton, FL, pp. 338-339.

Kim, I., et al., "Fully Integrated CMOS Ultrasound Transceiver Chip for High-Frequency High-Resolution Ultrasonic Imaging Systems," A Dissertation in Electrical Engineering, Dec. 2009, Pennsylvania State University, pp. 1-143.

Kim, I., et al., "CMOS Ultrasound Transceiver Chip for High-Resolution Ultrasonic Imaging Systems," IEEE Transactions on Biomedical Circuits and Systems, Oct. 2009, vol. 3, No. 5, IEEE, Piscataway, NJ, pp. 293-303.

International Search Report and Written Opinion for International Application No. PCT/US2014/046765, ISA/EPO, dated Nov. 21, 2014, 10 pages.

Beutel, J., et al., "Handbook of Medical Imaging: Physics and psychophysics," Flat-pannel array technology, 2000, vol. 2, SPIE Press, Bellingham, Washington, pp. 267-268.

Kim, I., et al., "Portable High-Frequency Ultrasound Imaging System Design and Hardware Considerations," which is Chapter 16 in "Integrated Microsystems: Electronics, Photonics, and Biotechnology," Edited by Krzysztof Iniewski, 2012, CRC Press, Boca Raton, FL, pp. 337-363.

\* cited by examiner

METHOD AND INTEGRATED CIRCUIT TO GENERATE A SIGNAL TO OPERATE A SENSOR ARRAY

I. CROSS-REFERENCE TO RELATED APPLICATIONS

The present disclosure claims priority from U.S. Provisional Patent Application No. 61/846,585, U.S. Provisional Patent Application No. 61/846,592, and U.S. Provisional Patent Application No. 61/846,604, each filed Jul. 15, 2013 and incorporated herein by reference in its entirety.

II. FIELD

The present disclosure is generally related to a method and integrated circuit for operating a sensor array.

III. DESCRIPTION OF RELATED ART

Advances in technology have resulted in smaller and more powerful electronic devices and communication systems. For example, there currently exist a variety of mobile devices, such as wireless telephones, personal digital assistants (PDAs), computer tablets, and paging devices. The mobile devices may be small, lightweight, and easily carried by users. Wireless telephones, such as cellular telephones and Internet Protocol (IP) telephones, can communicate voice and data packets over wireless networks. Further, many wireless telephones include other types of devices that are incorporated therein. For example, a wireless telephone can also include a digital still camera, a digital video camera, a digital recorder, and an audio stream player. Also, wireless telephones can process executable instructions, including software applications such as a web browser application that can be used to access the Internet. As such, wireless telephones and other mobile devices can include significant computing capabilities.

Mobile devices typically include display devices that display graphical user interfaces (GUIs) and other information to users. Certain display devices include capacitive touch sensors that enable users to enter text, scroll, and perform other operations by interacting with (e.g., touching) the display devices. However, the capacitive touch sensors may have certain limitations. For example, the resolution of a capacitive touch sensor may be limited and unable to detect the ridges and valleys of a fingerprint, particularly through a cover glass of a display. To obtain the desired resolution, the capacitive fingerprint sensors may need to be positioned to allow relatively close access for the tip of a finger. Accordingly, the capacitive devices may be incompatible with certain mobile device configurations (e.g., configurations that include a relatively thick glass display portion or where the display occupies a large portion of the mobile device area).

IV. SUMMARY

A method and integrated circuit for operating a sensor array are disclosed. In a particular embodiment, the integrated circuit corresponds to an application-specific integrated circuit (ASIC) that is configured to drive the sensor array, to receive sensed data from the sensor array, and to provide the sensed data to a processor (e.g., an applications processor of a mobile device). The integrated circuit (IC) may be referred to as an ultrasonic sensor array controller IC, an ultrasonic sensor controller, or simply as a controller chip.

The ultrasonic sensor array may be mounted in a display device and may be responsive to user interactions. For example, the sensor array may transmit an ultrasonic wave based on commands received from the integrated circuit. The ultrasonic wave may be reflected from an object (e.g., a fingertip of a user). The reflection may be received at the sensor array, and at least one signal may be provided to the integrated circuit from the sensor array. The integrated circuit may digitize the signal and provide the digitized signal to a processor. In a particular embodiment, the integrated circuit is configured to operate the sensor array and to provide data sensed from the sensor array to the applications processor.

In a particular embodiment, an apparatus includes an integrated circuit configured to be operatively coupled to a sensor array that is configured to generate an ultrasonic wave. The integrated circuit includes a transmitter circuit configured to provide a first signal to the sensor array. The integrated circuit further includes a receiver circuit configured to receive a second signal from the sensor array in response to providing the first signal. The sensor array includes an ultrasonic transmitter configured to generate the ultrasonic wave in response to the first signal and a piezoelectric receiver layer configured to detect a reflection of the ultrasonic wave. The sensor array may include pixels. The reflection of the ultrasonic wave may be reflected from a fingertip of a user.

In another particular embodiment, a method of operating a sensor array using an integrated circuit includes providing a first signal from the integrated circuit to the sensor array. The method further includes receiving a second signal from the sensor array. The second signal is generated in response to a reflection of an ultrasonic wave. The ultrasonic wave may be generated at the sensor array in response to the first signal. The sensor array includes an ultrasonic transmitter configured to generate the ultrasonic wave in response to the first signal and a piezoelectric receiver layer configured to detect the reflection of the ultrasonic wave. The sensor array may include pixels. The reflection of the ultrasonic wave may be reflected from a fingertip of a user.

In another particular embodiment, an apparatus includes an integrated circuit configured to be operatively coupled to a sensor array that is configured to generate an ultrasonic wave. The integrated circuit includes means for providing a first signal to the sensor array and means for receiving a second signal from the sensor array in response to providing the first signal. The sensor array includes an ultrasonic transmitter configured to generate the ultrasonic wave in response to the first signal and a piezoelectric receiver layer configured to detect a reflection of the ultrasonic wave. The sensor array may include pixels. The reflection of the ultrasonic wave may be reflected from a fingertip of a user.

In another particular embodiment, a computer-readable medium stores instructions executable by an integrated circuit to perform operations. The operations include providing a first signal from the integrated circuit to a sensor array and receiving a second signal from the sensor array. The second signal is generated in response to a reflection of an ultrasonic wave. The ultrasonic wave may be generated at the sensor array in response to the first signal. The sensor array includes an ultrasonic transmitter configured to generate the ultrasonic wave in response to the first signal and a piezoelectric receiver layer configured to detect the reflection of the ultrasonic wave.

In another particular embodiment, a method of operating a sensor array using an integrated circuit is disclosed. The method includes generating a receiver bias voltage at a first terminal of the integrated circuit to bias thin film transistors of the sensor array. The method further includes generating a control signal at a second terminal of the integrated circuit to cause an ultrasonic transmitter of the sensor array to generate an ultrasonic wave. The method further includes receiving data samples from the sensor array. The data samples may correspond to a reflection of the ultrasonic wave.

In another particular embodiment, an apparatus includes an integrated circuit. The integrated circuit includes a first terminal configured to generate a receiver bias voltage to bias thin-film transistors of a sensor array and a second terminal configured to generate a control signal to cause an ultrasonic transmitter of the sensor array to generate an ultrasonic wave. The integrated circuit further includes a third terminal configured to receive data samples from the sensor array. The data samples may correspond to a reflection of the ultrasonic wave.

In another particular embodiment, a computer-readable medium stores instructions executable by an integrated circuit to cause the integrated circuit to operate a sensor array. Operating the sensor array includes generating a receiver bias voltage at a first terminal of the integrated circuit to bias thin film transistors of the sensor array and generating a control signal at a second terminal of the integrated circuit to cause an ultrasonic transmitter of the sensor array to generate an ultrasonic wave. Operating the sensor array further includes receiving data samples from the sensor array. The data samples may correspond to a reflection of the ultrasonic wave.

In another particular embodiment, an apparatus includes an integrated circuit. The integrated circuit includes means for generating a receiver bias voltage to bias thin-film transistors of a sensor array and means for generating a control signal to cause an ultrasonic transmitter of the sensor array to generate an ultrasonic wave. The integrated circuit further includes means for receiving data samples from the sensor array. The data samples may correspond to a reflection of the ultrasonic wave.

A sensor having resolution capability for fingerprint detection yet capable of operating through a relatively thick cover glass or cover lens of a display device is desirable. One particular advantage provided by at least one of the disclosed embodiments is that a user is able to interact with a display or touchscreen that includes a relatively thick (e.g., between about one half to several millimeters thick) glass portion. For example, the sensor array may be compatible with a relatively thick glass portion. Such a configuration may be incompatible with other fingerprint sensor technologies, since those devices may need to be positioned relatively close to the surface of the display in order to respond to user interaction or to detect fingerprints or other biometric data. Additionally, design, manufacture, and assembly of certain components (e.g., mobile device components) using the integrated circuit may be simplified as compared to devices that use discrete circuitry rather than the integrated circuit. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
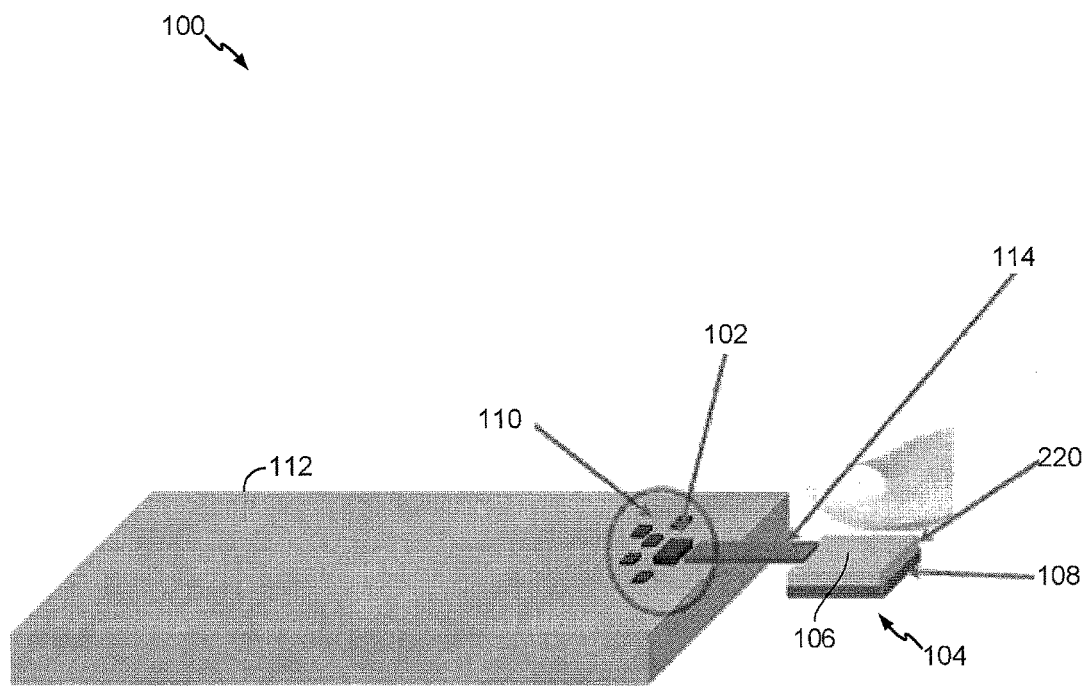
FIG. 1 is a diagram of a system that includes an integrated circuit configured to operate a sensor array.

Referring to FIG. 1, a particular illustrative embodiment of a system is depicted and generally designated 100. The system 100 may include an integrated circuit 102, a sensor array 104, a printed circuit board (PCB) 112, a flexible printed circuit (FPC) or flex circuit 114, and one or more additional components 110.

The sensor array 104 may include an arrangement of thin-film transistor (TFT) pixels 106 on a TFT substrate 220 and an ultrasonic transmitter 108. The sensor array 104 may be configured to generate an ultrasonic wave, as described further below. For example, the sensor array 104 may be configured to transmit the ultrasonic wave and to detect a reflection of the ultrasonic wave (e.g., a reflection from a fingertip). Alternatively or in addition to generating the ultrasonic wave, the sensor array 104 may be configured to send and receive one or more other signals (e.g., to display and/or receive information at a display device, such as a touchscreen device, as described further with reference to FIG. 10).

The one or more additional components 110 may include a processor, such as an applications processor of a mobile device. An applications processor may run, for example, one or more software applications associated with the mobile device. The additional components 110 may include one or more discrete resistors, capacitors, inductors, active devices, or integrated circuits (ICs). The flex circuit 114 may contain isolated electrical traces that interface between the sensor array 104 and the integrated circuit 102. Alternatively, the integrated circuit 102 and/or one or more additional components 110 may be attached and electrically connected to the flex circuit 114. One or more of the additional components 110 may be formed on or otherwise attached to the sensor array 104. The flex circuit 114 may include one or more electrical layers to provide electrical shielding and enhanced connectivity. Traces on the flex circuit 114 may be configured as one or more capacitors or inductors. Components may be mounted on one or more portions or sides of the flex circuit 114. More than one flex circuit 114 or other connective means such as wires, coaxial cable, or braided wire may serve to connect the sensor array 104 to the PCB 112.

In operation, the integrated circuit 102 may communicate with the sensor array 104. For example, the integrated circuit 102 may cause the ultrasonic transmitter 108 to generate an ultrasonic wave. The ultrasonic wave may be reflected from an object, such as a stylus, finger, or fingertip of a user, as illustrated in FIG. 1. The TFT pixels 106 may generate a signal in response to the reflected ultrasonic wave. The signals generated by the TFT pixels 106 may be received at the integrated circuit 102. The integrated circuit 102 may perform one or more operations on the signals received from the TFT pixels 106 and may provide a signal to any of the additional components 110, such as an applications processor of a mobile device.

Because the integrated circuit 102 performs one or more operations that may be performed by discrete components (e.g., custom circuitry for driving and sensing ultrasonic sensor arrays), operation of the system 100 is simplified as compared to systems using many discrete components. For example, custom circuitry may be cumbersome, bulky, costly, and/or unable to fit into the enclosure of a mobile device. The custom circuitry may be particularly cumbersome in the case of a mobile device with a small form factor. Therefore, the integrated circuit 102 may enable certain ultrasonic operations in connection with a mobile device.

Figure 2:
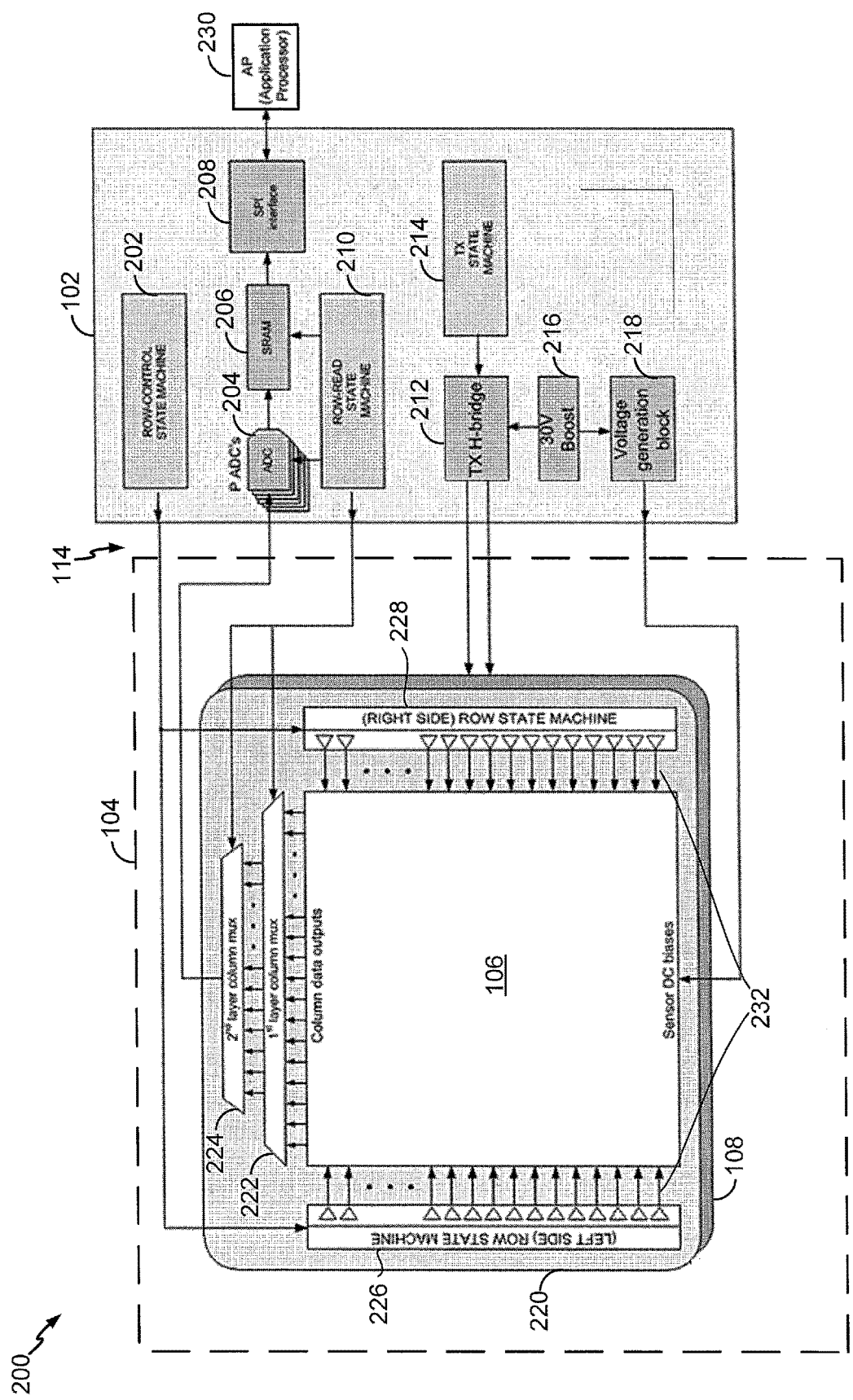
FIG. 2 is a diagram of a system that includes an integrated circuit, such as the integrated circuit of FIG. 1.

Referring to FIG. 2, a particular illustrative embodiment of a system is depicted and generally designated 200. Certain components and operations of the system 200 may be as described with reference to FIG. 1. For example, the system 200 may include the integrated circuit 102 and the sensor array 104. The sensor array 104 may include the TFT pixels 106 and the ultrasonic transmitter 108. The integrated circuit 102 and the sensor array 104 may be coupled via the flex circuit 114.

In the particular example illustrated in FIG. 2, the integrated circuit 102 includes a row-control state machine 202, an analog-to-digital converter (ADC) 204, a memory device 206, a communications interface such as a serial peripheral interface (SPI) 208, and a row-read state machine 210. Further, in the example of FIG. 2, the integrated circuit 102 may include a transmitter H-bridge circuit 212, a transmitter state machine 214, a boost circuit 216, and a transmitter voltage generator 218.

In addition, in the example illustrated in FIG. 2, the ultrasonic sensor array 104 may include a first layer column multiplexer (MUX) 222, a second layer column MUX 224, a first row state machine 226, and a second row state machine 228. The sensor array 104 may further include a TFT substrate, such as the TFT substrate 220 of FIG. 1. The TFT pixels 106 may be formed upon the TFT substrate 220. The integrated circuit 102 may include selection logic configured to select between individual TFT pixels of the sensor array 104. For example, the row-control state machine 202 and the row-read state machine 210 may be configured to select between individual TFT pixels of the sensor array 104. A plurality of gate drivers 232 may be configured to drive the TFT pixels 106 responsive to the integrated circuit 102 (e.g., responsive to the transmitter H-bridge circuit 212).

While the row state machines 226, 228 are shown on the left and right sides of TFT pixels 106 with gate drivers 232 positioned therebetween, other configurations may be used. In one example, all the gate drivers 232 may be on one side or the other of the TFT pixels 106. In another example, more than one row state machine 228 and associated gate drivers 232 may be located on one side or the other of the TFT pixels 106, to allow simultaneous driving of one or more rows of TFT pixels 106 in parallel or to allow interleaved row-selection methods. While the arrangement of TFT pixels 106 shows rows in one direction and columns in another, it is understood that rows and columns may be interchanged without loss of generality and that the TFT pixels 106 may be arranged other than in a row-column arrangement such as a circular array or as groups of one or more pixels that may serve, for example, as sensor arrays for ultrasonic buttons.

The system 200 may further include a processor, such as an applications processor 230. The applications processor 230 may be coupled to the integrated circuit 102 via the flex circuit 114, an interface, a communications interface, a bus, one or more other structures, or a combination thereof. In the particular example of FIG. 2, the applications processor 230 is coupled to the integrated circuit 102 via the SPI interface 208.

In operation, the integrated circuit 102 may operate the sensor array 104 via the flex circuit 114. For example, the integrated circuit 102 may utilize the row-control state machine 202 to operate the first row state machine 226 and/or the second row state machine 228 to select one or more individual TFT pixels 106 or rows of TFT pixels 106 of the TFT substrate 220. Further, the transmitter voltage generator 218 may generate a signal that is provided to the ultrasonic transmitter 108 via the flex circuit 114. The transmitter H-bridge circuit 212 may apply voltages to the ultrasonic transmitter 108. In response to the signal from the transmitter H-bridge circuit 212, the ultrasonic transmitter may generate an ultrasonic wave. The ultrasonic wave may propagate through components of the system 200 to an object such as a stylus or a finger of a user. The ultrasonic wave may be reflected by the object and may be received at the TFT substrate 220. The reflected ultrasonic wave may induce voltages at the TFT substrate 220 that are sensed by the TFT pixels 106 to generate data that may be read out from the TFT substrate 220.

The integrated circuit 102 may use the row-read state machine 210 to operate the MUXs 222, 224 and to select data outputs (e.g., columns of data) from the TFT substrate 220 so that values from the TFT substrate 220 may be read based on an ultrasonic wave detected at the TFT pixels 106. Data read from the MUXs 222, 224 by the integrated circuit 102 may be provided to the ADC 204 and loaded into the memory device 206. The data may be provided to or accessed by the applications processor 230 via the SPI interface 208. In a particular embodiment, the column multiplexers may be configured in a single level group. Alternatively, the column multiplexers may be configured in two or more levels, or ganged into parallel groups.

Because the sensor array 104 is operated by the integrated circuit 102, processing resources of the applications processor 230 may be freed or otherwise made available for running other applications. For example, because the integrated circuit 102 operates the TFT pixels 106 and the ultrasonic transmitter 108, processing resources at the applications processor 230 are free to perform other processing tasks. Accordingly, performance at the applications processor 230 may be improved as compared to certain configurations in which an applications processor 230 directly controls a sensor array.

Figure 3:
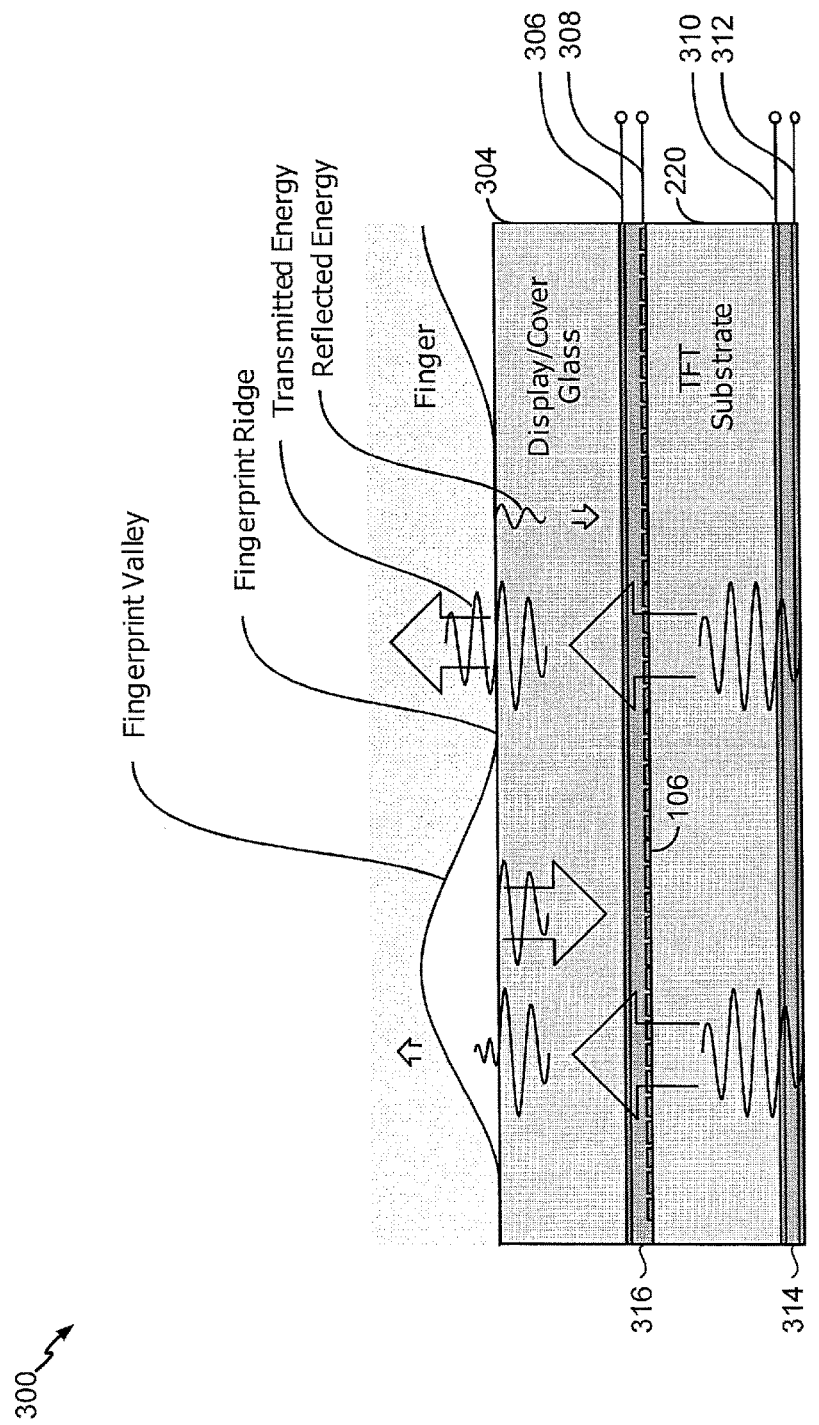
FIG. 3 is a diagram of a device, such as a portion of the sensor array of FIG. 1.

Referring to FIG. 3, a particular illustrative embodiment of a device is depicted and generally designated 300. In a particular embodiment, the device 300 corresponds to a portion of the sensor array 104 of FIG. 1. In a particular embodiment, FIG. 3 illustrates a cross-sectional view of a portion of the sensor array 104 in the TFT substrate 220.

The device 300 may include the TFT pixels 106 and the TFT substrate 220. The TFT substrate 220 may be coupled to a display or cover glass 304 (e.g., a cover glass or cover lens of a mobile device). A piezoelectric transmitter layer 314 may be coupled to a first transmitter electrode 310 and to a second transmitter electrode 312, and to the TFT substrate 220. The piezoelectric transmitter layer 314 and transmitter electrodes 310, 312 may correspond to the ultrasonic transmitter 108 of FIG. 1. One or both of the transmitter electrodes 310 or 312 may be segmented. In at least one alternate embodiment, neither of the transmitter electrodes 310, 312 is segmented. The TFT substrate 220 may be coupled to a receiver bias electrode 306, to pixel input electrodes 308, and to a piezoelectric receiver layer 316. The pixel input electrodes 308 may transfer charge generated by the piezoelectric receiver layer 316 by impingement of an ultrasonic wave onto the TFT pixels 106. The piezoelectric receiver layer 316 may have a thickness that corresponds to the particular application. According to various embodiments, the thickness may be between 100 micrometers (µm) and 5 millimeters (mm).

In operation, the piezoelectric transmitter layer 314 may be responsive to signals applied at the transmitter electrodes 310, 312. For example, application of voltages across one or more of the transmitter electrodes 310, 312 may cause the piezoelectric transmitter layer 314 to emit an ultrasonic wave. The ultrasonic wave may be reflected from an object, such as a finger of a user (e.g., a fingerprint valley or a fingerprint ridge as illustrated in FIG. 3). The reflected ultrasonic wave may propagate through the display or cover glass 304 and may be received at the piezoelectric receiver layer 316. The piezoelectric receiver layer 316 may be coupled to the TFT substrate 220. The piezoelectric receiver layer 316 may generate a voltage between the receiver bias electrode 306 and the pixel input electrodes 308, which is provided to TFT pixels 106 of the TFT substrate 220. Data corresponding to the reflected ultrasonic wave may be read from the TFT pixels 106 of the TFT substrate 220.

The techniques illustrated with reference to FIG. 3 may enable user interaction with a display device having a relatively thick cover glass portion. For example, user interactions and/or user characteristics may be detected even when the display or cover glass 304 has a thickness between about a half of a millimeter and several millimeters or more. Additionally, since the ultrasonic wave may be reflected by a fingertip of a user that has fingerprint ridge and fingerprint valley characteristics as illustrated in FIG. 3, the reflected ultrasonic wave may be used for fingerprint detection and/or recognition, as explained further with reference to FIG. 10. As shown in FIG. 3, the piezoelectric receiver layer 316 is positioned between the piezoelectric transmitter layer 314 and an outer surface of the display or cover glass 304. In other configurations, the piezoelectric transmitter layer 314 may be positioned between the piezoelectric receiver layer 316 and the outer surface of the display or cover glass 304. Among other configurations, the piezoelectric transmitter layer 314 and the piezoelectric receiver layer 316 may be on the same side of the TFT substrate 220.

Figure 4:
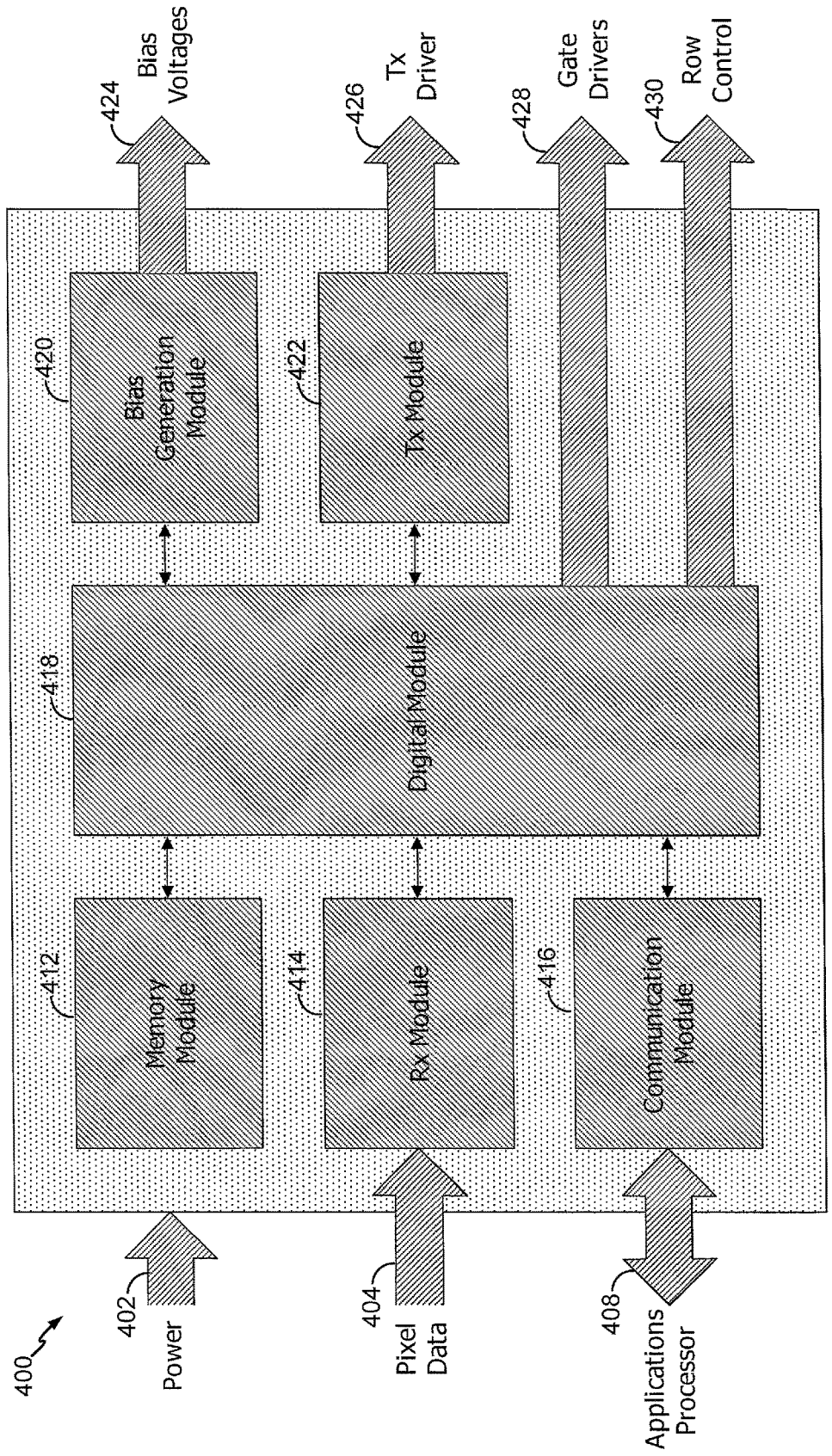
FIG. 4 is a diagram of an integrated circuit, such as the integrated circuit of FIG. 1.

Referring to FIG. 4, a particular illustrative embodiment of an integrated circuit is depicted and generally designated 400. The integrated circuit 400 may correspond to the integrated circuit 102 of FIG. 1.

The integrated circuit 400 may include a memory module 412, a receiver module 414, a communication module 416, a digital module 418 sometimes referred to as a controller module, a bias generation module 420, and a transmitter module 422. Further, the integrated circuit 400 may include multiple interfaces for communicating with other circuits and/or devices. For example, in the particular example of FIG. 4, the integrated circuit 400 includes a power interface 402, a data interface 404 (e.g., one or more input terminals of the integrated circuit 102), an applications processor interface 408, a bias voltage interface 424, a transmitter driver interface 426 (e.g., one or more output terminals of the integrated circuit 102), a gate driver interface 428, and a row-control interface 430.

In operation, the integrated circuit 400 may utilize the one or more interfaces to send and receive signals and/or information. For example, the bias generation module 420 may generate one or more bias voltages (e.g., receiver bias or RBIAS, as described in FIG. 7) that may be applied to an ultrasonic sensor array via the bias voltage interface 424. As another example, the transmitter module 422 may generate and apply one or more signals that may be applied to an ultrasonic transmitter via a transmitter driver circuit within the transmitter module 422 and the transmitter driver interface 426 (e.g., H-bridge control and enable, as in FIG. 7). As another example, the digital module 418 may generate signals that are applied to the sensor array via the gate driver interface 428 and/or the row-control interface 430. The gate driver interface 428 may connect to and control gate drivers on the TFT substrate, such as the drivers associated with the left- and right-side row state machine shown in FIG. 2.

Further, the multiple interfaces of the integrated circuit 400 may be utilized to receive power at the integrated circuit 400. In the example of FIG. 4, the integrated circuit 400 may utilize the power interface 402 to receive power from one or more voltage sources. The integrated circuit 400 may utilize the data interface 404 to receive data, such as data from a sensor array, which may correspond to the sensor array 104 of FIG. 1. The integrated circuit 400 may control selection of rows and/or columns of data from the sensor array using the gate driver interface 428 and the row-control interface 430. Further, the integrated circuit 400 may utilize the applications processor interface 408 to send and/or to receive data from a processor, such as the applications processor 230 of FIG. 2.

Because the integrated circuit 400 includes one or more functionalities and/or structures that may be implemented in discrete circuits, manufacturing and/or design of the integrated circuit 400 may be simplified as compared to discrete devices. For example, a single integrated circuit may be mounted upon a printed circuit board (PCB) or the flex circuit instead of mounting multiple discrete circuits upon the PCB or flex circuit.

Figure 5:
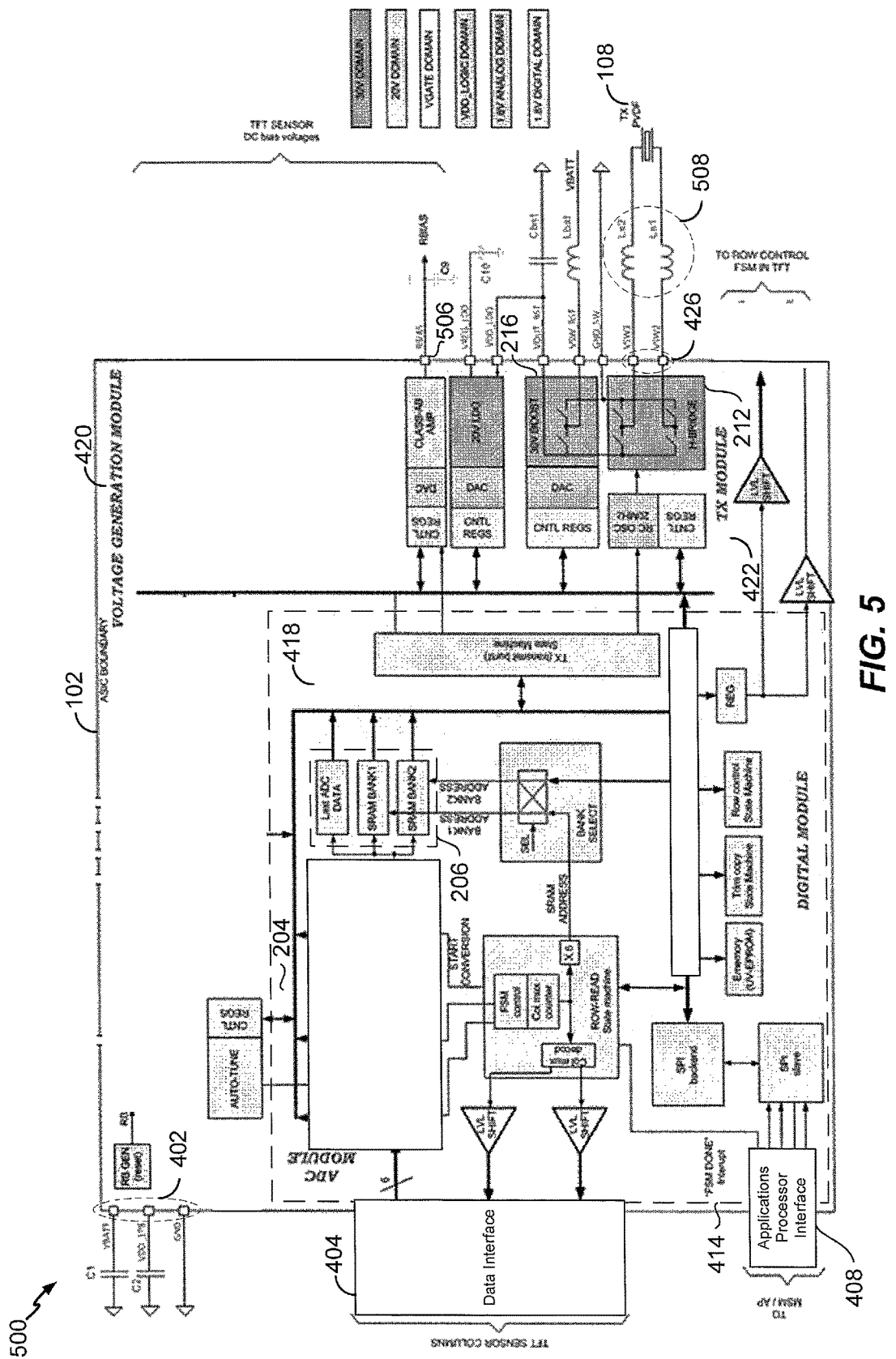
FIG. 5 is a diagram of a particular illustrative embodiment of a system that includes an integrated circuit, such as the integrated circuit of FIG. 1.

Referring to FIG. 5, a particular illustrative embodiment of a system is depicted and generally designated 500. Certain components and operations of the system 500 of FIG. 5 may be as described with reference to FIGS. 1, 2 and 4. For example, the system 500 may include the integrated circuit 102 of FIG. 1. Further, the system 500 may include the ultrasonic transmitter 108 of FIG. 1. The system 500 may further include the ADC 204 and the memory device 206 of FIG. 2. As additional examples, the system 500 may include the receiver module 414, the digital module 418, the transmitter module 422, and the bias voltage generation module 420 of FIG. 4.

In the particular example of FIG. 5, the system 500 further includes the power interface 402, the data interface 404, the applications processor interface 408, and the transmitter driver interface 426 of FIG. 4. Further, in the example of FIG. 5, the system 500 includes an RBIAS or receiver bias voltage interface 506, which may be a subset of the bias voltage interface 424.

The system 500 may further include a resonator circuit 508 and the boost circuit 216 of FIG. 2. The resonator circuit 508 may include a resonant device, such as a resonant inductor-capacitor (LC) circuit. In the particular example of FIG. 5, the resonator circuit 508 includes inductive elements such as inductors Ls1, Ls2. The inductors Ls1, Ls2 may be formed, for example, from discrete inductive devices or from inductive traces on the flex circuit 114. According to further embodiments, the resonator circuit 508 may include different components than the example of FIG. 5. Those of skill in the art will recognize that a variety of resonant circuits can be implemented depending on the particular application.

In operation, the integrated circuit 102 may receive data from a sensor array, such as the sensor array 104 of FIG. 1. The data may be received via the data interface 404 (e.g., data representing signal levels stored at TFT sensor pixels responsive to a reflected ultrasonic wave). The ADC 204 may convert the data from an analog representation to a digital representation to generate digital data. The digital data may be provided to the memory device 206. The digital data may be provided from the memory device 206 to a processor, such as the applications processor 230 of FIG. 2, via the applications processor interface 408. In a particular illustrative embodiment, a row of data (corresponding to a row of pixels of the sensor array 104) is provided to the processor via the applications processor interface 408 from the memory device 206 while another row of data is loaded into the memory device 206. That is, rows of data from the sensor array may be provided to the processor on a "per-row" basis. In another particular embodiment, a portion of the rows or a portion of the sensor array may be selected for reading out. For example, every other row or every third row or fourth row may be read out to increase the frame rate for capturing an ultrasonic image. Individual TFT pixels or groups of TFT pixels may be read out. A single row or set of rows may be selected multiple times for readout. The sensor controller IC may read one or more rows in a forward direction and then read one or more rows in a reverse or backward direction. TFT pixels near the perimeter of the TFT substrate 220 or in select portions of the TFT substrate 220 may be read multiple times to achieve a better signal-to-noise ratio or signal quality. The speed and mode of scanning may be determined by the sensor controller IC. The speed and mode of scanning may be determined by the applications processor 230.

The integrated circuit 102 may generate a signal at the transmitter H-bridge circuit 212. The voltage generated by the transmitter H-bridge circuit 212 may be provided to the ultrasonic transmitter 108 via the transmitter driver interface 426. In a particular embodiment, a piezoelectric receiver layer coupled to the TFT pixels 106 may be biased using a receiver bias voltage (e.g., RBIAS illustrated in FIG. 5) via the receiver bias voltage interface 506. The receiver bias voltage interface 506 may control when the TFT pixels detect ultrasonic waves, as described further with reference to FIG. 7. The integrated circuit 102 may have on-board control of driving the sensor array 104 and reading the sensor array 104 row-by-row. For example, a transmitter state machine may control the transmitter module 422 to generate a driving voltage provided to the ultrasonic transmitter 108 of the sensor array 104. The transmitter state machine may control frequency and timing of an ultrasonic wave, such as by sweeping or changing a frequency of operation of the ultrasonic transmitter 108 (responsive to a control signal from a processor). The magnitude, frequency, and/or number of voltage or current pulses or cycles applied to the ultrasonic transmitter may be controlled. Further, a row-control state machine may control operation of multiplexers to read data from the sensor array 104.

In a particular embodiment, the transmitter H-bridge circuit 212 is responsive to a boost signal from the boost circuit 216. For example, the transmitter H-bridge circuit 212 may receive a 30-volt boost signal from the boost circuit 216, as illustrated in the particular example of FIG. 5. It should be appreciated that the example of FIG. 5 is illustrative and that the particular boost signal provided to the transmitter H-bridge circuit 212 (if any) will typically depend on the particular application.

The transmitter H-bridge circuit 212 may be responsive to the boost circuit 216 to generate an output signal at the transmitter driver interface 426. The output signal may be applied at the resonator circuit 508. The resonator circuit 508 may be configured to resonate at a particular frequency based on the output signal to provide a burst signal to the ultrasonic transmitter 108. The burst signal may be a burst signal of several hundred volts (e.g., approximately 200 volts). For example, in a particular illustrative embodiment, in a resonance condition the resonator circuit 508 is configured to cause a voltage gain that amplifies a voltage from approximately 30 volts to a high voltage burst signal based on the output signal provided by the transmitter H-bridge circuit 212. In a particular embodiment, the burst signal has a voltage swing of 30 volts peak-to-peak to 400 volts peak-to-peak. The burst signal may cause the ultrasonic transmitter 108 to generate an ultrasonic wave, as described further below.

The system 500 of FIG. 5 may enable improved efficiency of operations. For example, the system 500 may enable efficient communications between the integrated circuit 102 and a processor by providing rows of data from the memory device 206 to the processor on a "per-row" basis. Accordingly, a first row of data may be provided to the processor while a second row of data is sensed from the sensor array 104 and/or loaded into the memory device 206.

Figure 6:
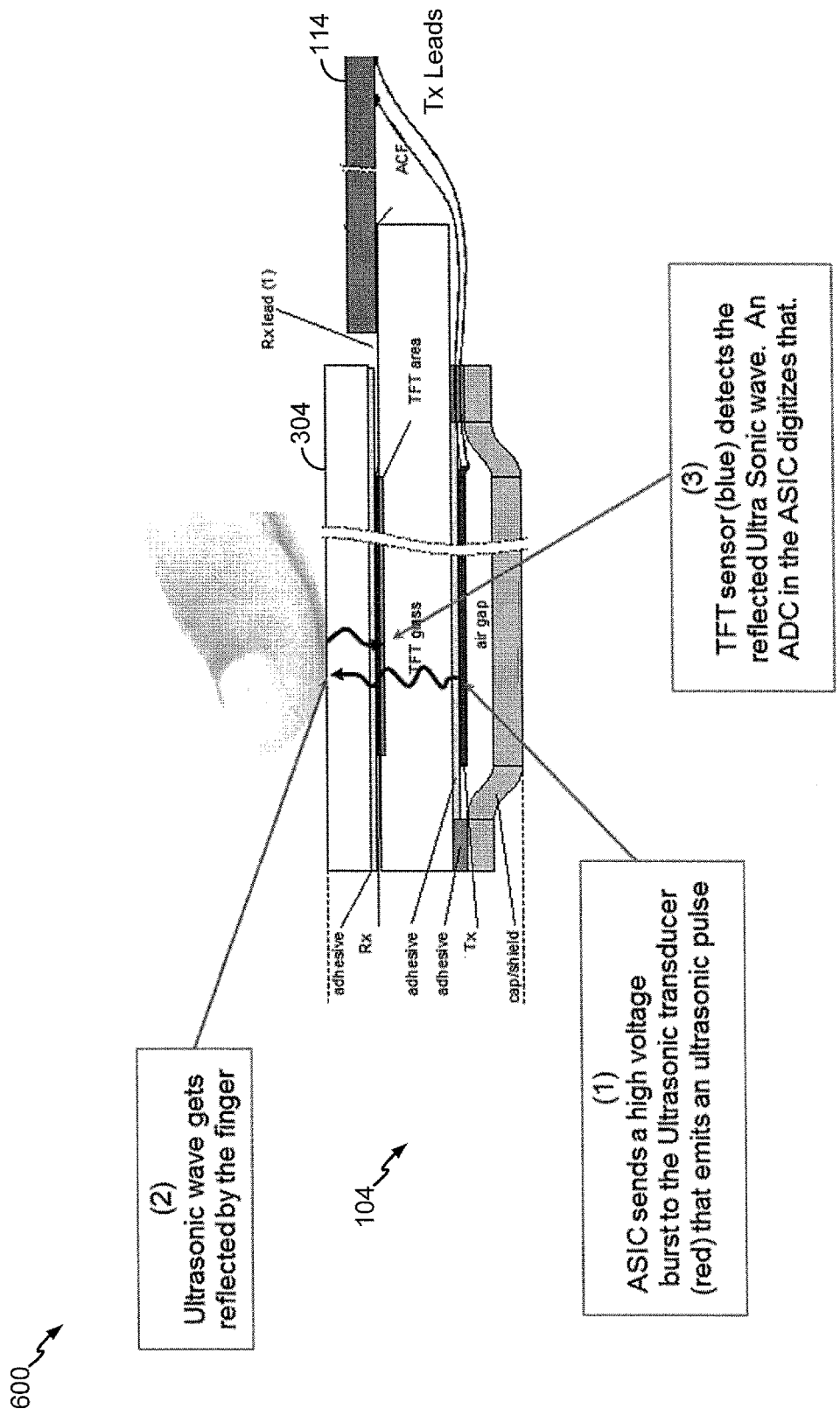
FIG. 6 is a diagram illustrating an example operation of a system that includes a sensor array, such as the sensor array of FIG. 1.

Referring to FIG. 6, an example operation of a system 600 is depicted. Certain components and/or operations of the system 600 may be as described with reference to FIG. 1. For example, the system 600 may include the sensor array 104 and the flex circuit 114 of FIG. 1. In a particular illustrative embodiment, the flex circuit 114 may include a flex cable coupling the sensor array 104 to the integrated circuit 102 of FIG. 1. The system 600 may include the display or cover glass 304 of FIG. 3. According to at least one alternate embodiment, a cover glass portion may be omitted from the system 600.

As illustrated, operation of the system 600 may include sending a high voltage burst to an ultrasonic transmitter, such as the ultrasonic transmitter 108 of FIG. 1 (e.g., by the piezoelectric transmitter layer 314 of FIG. 3). The high voltage burst may be transmitted by the integrated circuit 102 of FIG. 1 via the flex circuit 114. The high voltage burst may cause the ultrasonic transmitter to emit an ultrasonic wave. The ultrasonic wave may be transmitted through and reflected from a surface of an attached substrate.

The example of FIG. 6 illustrates certain components and materials. It should be appreciated the particular example of FIG. 6 is illustrative and that other configurations are within the scope of the disclosure. For example, the particular dimensions of components of the system 600 will depend on the particular application. In a particular embodiment, the adhesives illustrated in FIG. 6 each have a thickness within a range of approximately 25-50 micrometers (μm). The receiver portion (Rx) may have a thickness of approximately 12 μm. The transmitter portion (Tx) may have a thickness of approximately 28 μm. The cap/shield portion may have a thickness of approximately 200 μm. The display or cover glass 304 may have a thickness within a range of approximately 130-170 μm (e.g., approximately 150 μm). The flex circuit 114 may have dimensions of approximately 10 mm, 30 mm, and 0.1 mm.

As illustrated in the example of FIG. 6, the ultrasonic wave may be reflected by an object such as a fingertip. The reflected ultrasonic wave may be detected at the sensor array 104 by the piezoelectric receiver layer 316 of FIG. 3 and an array of TFT pixels 106 electrically coupled to the piezoelectric receiver layer 316. The TFT pixels may change state (e.g., store a voltage) responsive to the reflected ultrasonic wave and the voltage generated across the piezoelectric receiver layer 316.

Thus, the one or more TFT sensor pixels may generate a voltage in response to the reflected ultrasonic wave. The voltage may be transmitted to the integrated circuit 102 of FIG. 1 via the flex circuit 114. Further, the ADC 204 of FIG. 2 may receive the voltage and digitize the voltage to generate digital data usable by a processor, such as the applications processor 230 of FIG. 2.

Figure 7:
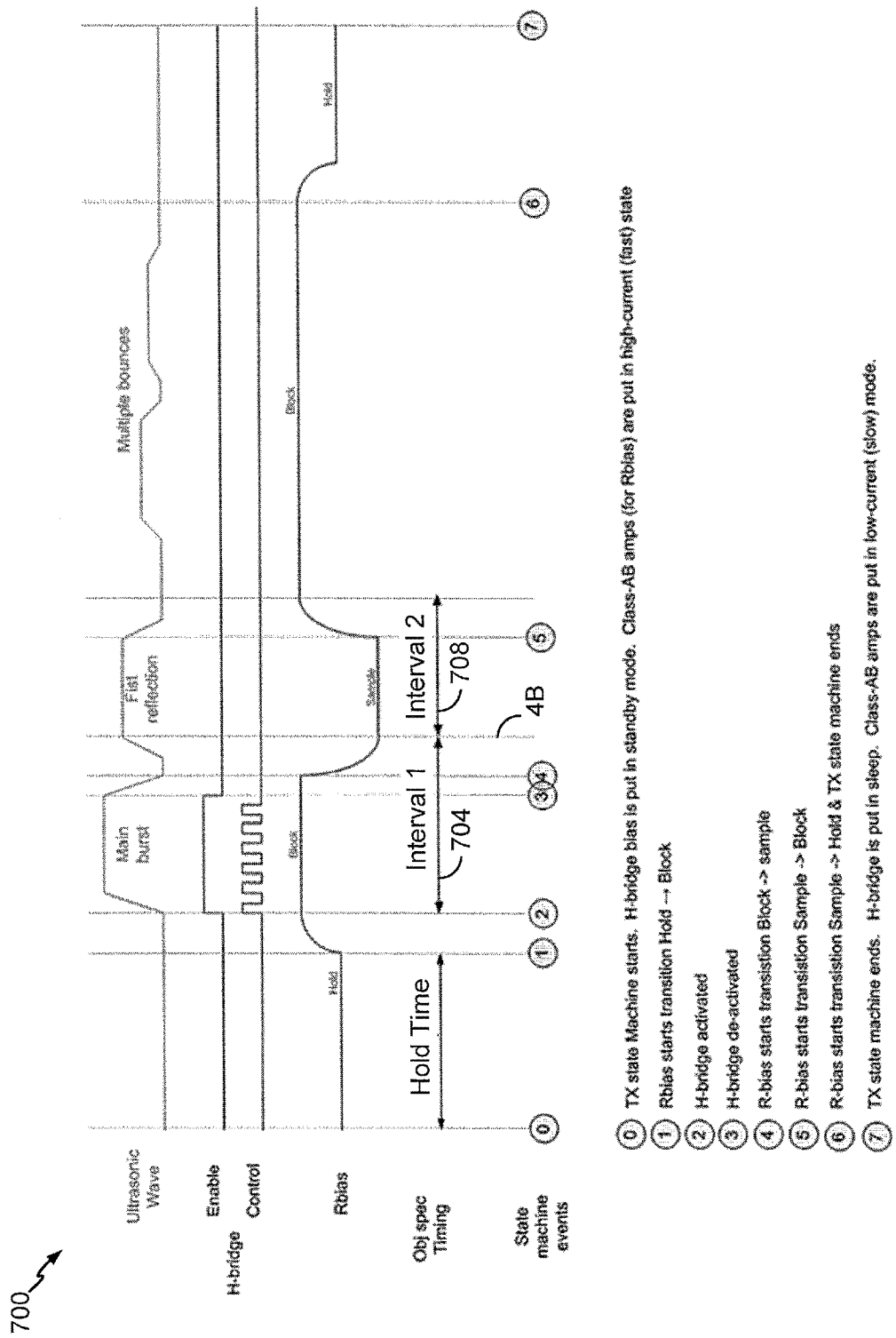
FIG. 7 is a diagram illustrating an example operation of an integrated circuit, such as the integrated circuit of FIG. 1.

Referring to FIG. 7, a timing diagram of an example operation of an integrated circuit is depicted and generally designated 700. The integrated circuit described with reference to FIG. 7 may correspond to the integrated circuit 102 of FIG. 1. The particular example of FIG. 7 illustrates certain timing associated with one or more particular applications. For example, the timing between the start of the main burst of the ultrasonic wave and the beginning of one or more reflected waves may be on the order of 450 nanoseconds (ns). The timing allowed for sampling the first reflection may be on the order of 360 ns. Those of skill in the art will appreciate that such timing is provided for illustrative purposes and the particular timing and/or durations will depend on the particular application. For example, the timing of an ultrasonic wave may depend on a size (e.g., "acoustic stack thickness") of the ultrasonic transmitter 108 and the thickness of the TFT substrate 220, among others.

To further illustrate, FIG. 7 illustrates particular example durations of a first time interval 704 and a second time interval 708. It should be appreciated that the time intervals 704, 708 are illustrative and not necessarily drawn to scale. For example, the second time interval 708 may be of a longer duration than the first time interval 704, depending on the particular application. In a particular embodiment, the time intervals 704, 708 comprise approximately 450 nanoseconds (ns) and 360 ns, respectively. It will be appreciated that durations of the time intervals 704, 708 may depend on a size (e.g., "acoustic stack thickness") of piezoelectric receiver layer 316 of FIG. 3, the thickness of the TFT substrate 220 of FIG. 2, another metric, or a combination thereof.

As illustrated in FIG. 7, operation may include initiating operation of the integrated circuit. For example, a transmitter state machine, such as the transmitter state machine 214 of FIG. 2, may begin the operation. Further, an H-bridge device, such as the transmitter H-bridge circuit 212 of FIG. 2, may be put in a standby mode. Certain amplifiers of the integrated circuit, such as class-AB amplifiers, may be put into an operating state instead of a low-power standby mode. In the example of FIG. 7, the operation includes transitioning a receiver bias voltage RBIAS into a block mode of operation. The RBIAS voltage may be applied to the ultrasonic sensor array, such as the receiver bias electrode 306 of FIG. 3 operatively coupled to TFT pixels 106 of FIG. 1. In a particular embodiment, the block mode of operation is associated with a state in which the TFT pixels 106 do not generate voltages responsive to an ultrasonic wave striking the pixels (either emitted or reflected). In a particular embodiment, the receiver bias voltage RBIAS has a block value (as illustrated in FIG. 7) for a duration that is within a range of approximately 1 to 3 microseconds (μs). The duration for which the receiver bias voltage RBIAS has the block value may depend on a component thickness, such as a thickness of the TFT substrate 220, a duration (e.g., a number of burst cycles) of an H-bridge enable signal, a frequency of the H-bridge enable signal, or a combination thereof.

The operations may further include operating (e.g., activating and/or deactivating) the H-bridge device, such as by enabling and controlling the H-bridge device to cause the piezoelectric transmitter layer 314 or ultrasonic transmitter 108 to generate an ultrasonic wave. For example, FIG. 7 depicts that the H-bridge enable signal is asserted during a main burst of an ultrasonic wave (e.g., an ultrasonic wave transmitted by the ultrasonic transmitter 108). For example, the H-bridge enable signal may cause the transmitter H-bridge circuit 212 to transition from a "standby" mode of operation to an "on" mode of operation. In a particular embodiment, the main burst of the ultrasonic wave has a duration that is within a range of approximately 20 nanoseconds (ns) to 1.1 μs as compared to a transmit duration that is between 0.24 to 0.53 μs. The duration of the main burst may depend on a number of burst cycles of the ultrasonic transmitter 108, a frequency of the ultrasonic transmitter 108, or a combination thereof.

FIG. 7 further depicts that an H-bridge control signal changes values (e.g., is toggled) one or more times during the main burst. The duration of the main burst illustrated in FIG. 7 may depend on the number of cycles and frequency of the H-bridge control signal. In a particular embodiment, the H-bridge control signal is applied at the transmitter H-bridge circuit 212 to cause the transmitter H-bridge circuit 212 to generate the output signal at the transmitter driver interface 426 described with reference to FIG. 5. The output signal may be applied at the resonator circuit 508. The resonator circuit 508 may be configured to resonate at a particular frequency based on the output signal to provide a burst signal to the ultrasonic transmitter 108. The burst signal may cause the ultrasonic transmitter 108 to generate an ultrasonic wave, such as the "main burst" of the ultrasonic wave illustrated in the example of FIG. 7. In a particular embodiment, the receiver bias voltage RBIAS has a sample value (as illustrated in FIG. 7) for a duration that is within a range of approximately 0.25 to 1.5 microseconds (μs). The particular duration for which the receiver bias voltage RBIAS has the sample value may depend on a duration (e.g., a number of burst cycles) of the H-bridge enable signal, a frequency of the H-bridge enable signal, or a combination thereof.

After the ultrasonic wave is transmitted, the receiver bias voltage RBIAS may be transitioned from the block mode to a sample mode in which voltages may be received at the TFT pixels. In the example illustrated in FIG. 7, the transition from the block mode to the sample mode includes a duration from timing event "4" to timing event "4B," as illustrated. The duration may correspond to a thickness of a display or cover glass portion (e.g., the display or cover glass 304). For example, because the main burst may need to propagate through the display or cover glass portion, the receiver bias voltage RBIAS may be maintained at the block value until the main burst has propagated past a receiver device, such as the piezoelectric receiver layer 316 of FIG. 3. The receiver bias voltage RBIAS may be transitioned to the sample value between timing event "4" and timing event "4B" before a first reflection of the main burst is received at the receiver device.

During the sample mode, the piezoelectric receiver layer 316 may generate a signal responsive to the first reflection of the ultrasonic wave arriving at the receiver device. TFT pixels may store voltages responsive to the signal generated by the piezoelectric receiver layer. The operations may further include transitioning a value of the receiver bias voltage RBIAS from the sample mode to the block mode and/or transitioning the bias voltage from the sample mode to the hold mode of operation. The operations may further include putting devices to sleep, such as putting the H-bridge device to sleep and/or putting the amplifiers in a low current mode of operation.

When the receiver bias voltage RBIAS has the value associated with the block mode of operation during the main burst of the ultrasonic wave, the TFT pixels do not store voltages responsive to reception or transmission of the ultrasonic wave. Further, as illustrated in FIG. 7, the receiver bias voltage RBIAS may have the block value while additional bounces of the reflected wave occur, thus reducing or preventing reception of bounces after reception of the first reflection of the ultrasonic wave.

Figure 8:
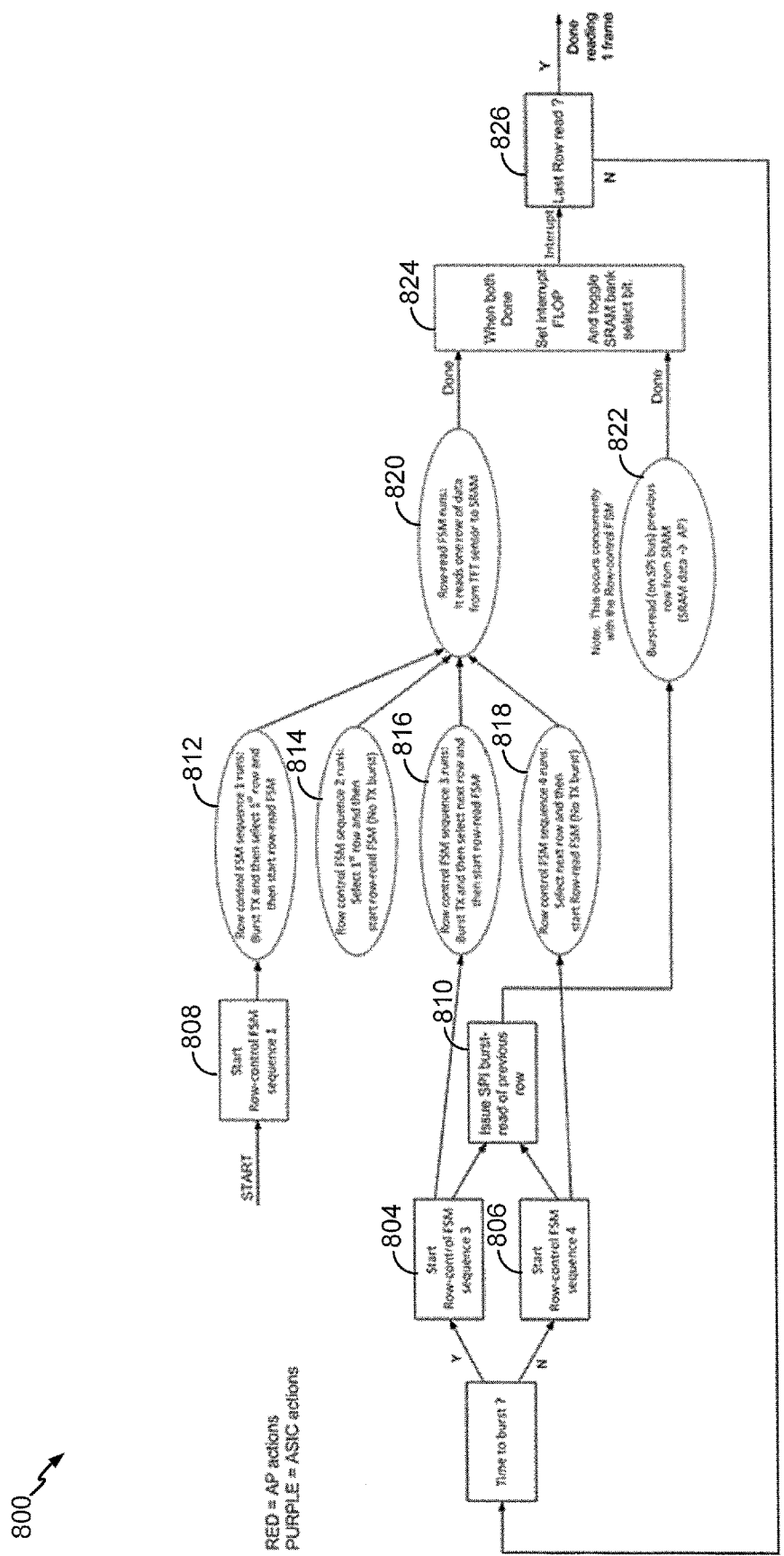
FIG. 8 is a diagram illustrating an example operation of a row state machine, such as a row state machine included in the integrated circuit of FIG. 2.

Referring to FIG. 8, a particular illustrative embodiment of example operations of the row-read state machine 210 of FIG. 2 are depicted and generally designated 800. The operations of FIG. 8 may correspond to reading a frame of data at the sensor array 104 of FIG. 2. At 808, the operations include initiating operation at the row-read state machine 210, generally referred to as a finite-state machine (FSM). At 812, the operations include selecting a first row while a transmit burst is applied to the ultrasonic transmitter 108. A row of data may be read from the TFT pixels 106, at 820. The row of data may be stored at a memory device, such as the memory device 206. At 824, an interrupt may be asserted (e.g., to indicate that rows of data are available to be read from the memory device by an applications processor, such as the applications processor 230). As a particular example, a bit stored at a flip-flop of the integrated circuit 102 may be set to indicate that data is available to be read from the memory device by the applications processor. The bit may be readable by the applications processor via an interface, such as the SPI 208.

At 826, a determination is made whether a last row of a frame of data has been read. If the last row of the frame of data has been read, then the operations of FIG. 8 may terminate. For example, reading of a second frame of data may be initiated upon determining that the last row has been read. If the last row has not been read, then row-control sequences may be initiated, at 804 or at 806, based on whether a burst event is to occur. A row of data may be read, at 810. Data may be provided from the memory device to the applications processor, at 822. For example, data may be provided from row-control state machines at 814, at 816, and at 818.

The operations of FIG. 8 illustrate that data samples (e.g., a row of data) may be buffered in the memory device and provided to the applications processor while additional data samples (e.g., a second row of data) is read from a sensor array, such as the TFT pixels 106 of the sensor array 104. The operations of FIG. 8 may enable improved efficiency of operations. For example, the operations of FIG. 8 may enable efficient communications between the integrated circuit 102 and the applications processor 230 by providing rows of data from the memory device 206 to the applications processor 230 on a "per-row" basis. Accordingly, a first row of data may be provided to the applications processor 230 while a second row of data is sensed from the sensor array 104 and/or loaded into the memory device 206. In a particular embodiment, an image of a fingerprint may be obtained by acquiring a first or reference frame of data without generating an ultrasonic wave, followed by acquiring a second or image frame of data after generating an ultrasonic wave, then subtracting the reference frame from the image frame to obtain an ultrasonic image. One or more image frames may be acquired per reference frame. In another particular embodiment, the reference frame may be acquired after the acquisition of an image frame and subtracted accordingly. In another particular embodiment, data from one or more rows of TFT pixels may be acquired with and without an accompanying ultrasonic wave to allow nearly immediate subtraction of the background or reference signal levels. The subtractions may be performed, for example, in either the applications processor or within the integrated circuit 102.

Figure 9:
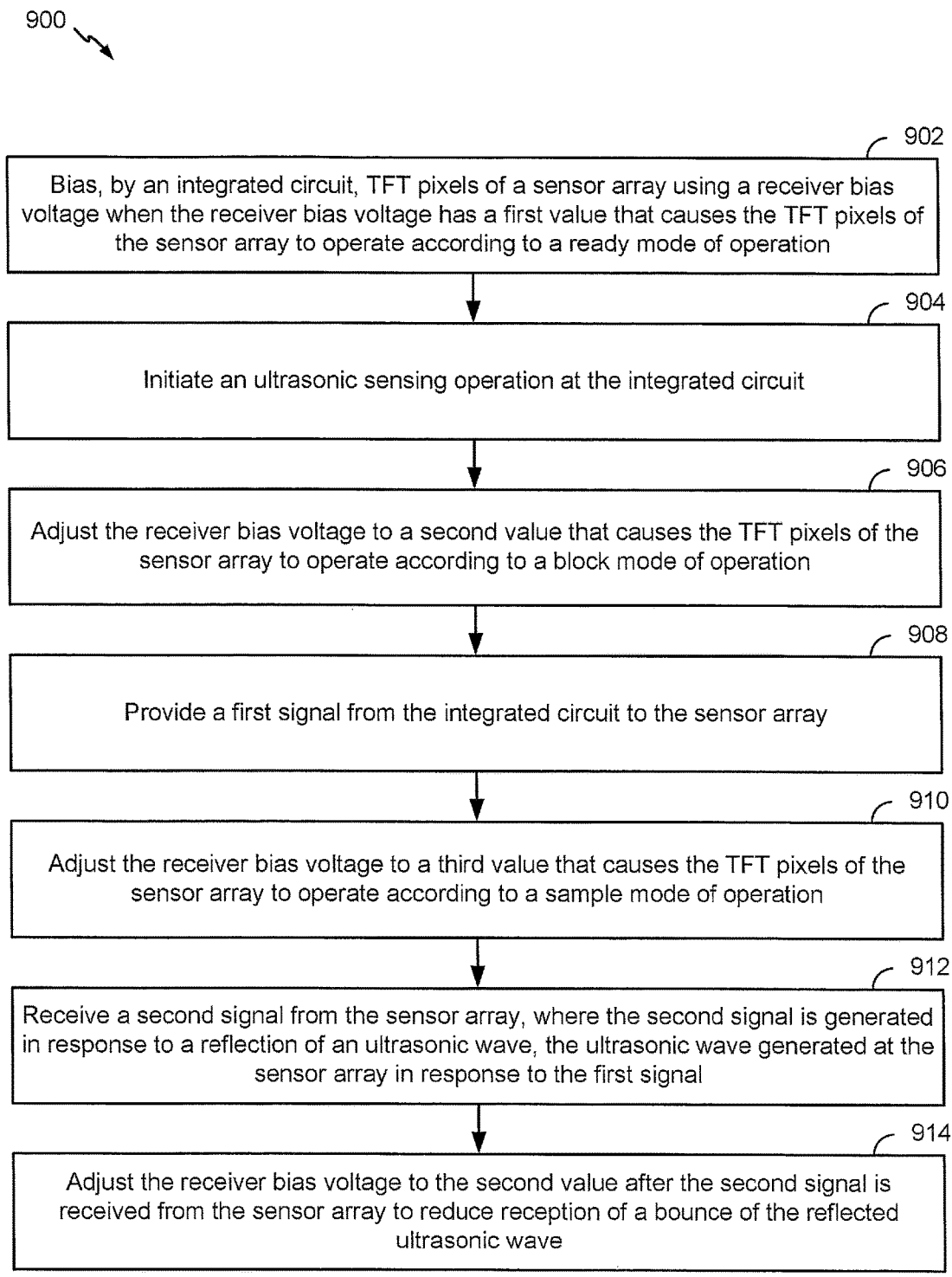
FIG. 9 is a diagram of a particular illustrative embodiment of a method of operating an integrated circuit, such as the integrated circuit of FIG. 1.

Referring to FIG. 9, a particular illustrative embodiment of a method of operation of an integrated circuit is depicted and generally designated 900. The integrated circuit described with reference to FIG. 9 may correspond to the integrated circuit 102 of FIG. 1.

The method 900 may include biasing, by the integrated circuit, thin-film transistor (TFT) pixels of a sensor array, at 902. The sensor array and the TFT sensor pixels may correspond to the sensor array 104 and the TFT pixels 106 of FIG. 1, respectively. The TFT pixels may be biased using a receiver bias voltage, such as the receiver bias voltage RBIAS described with reference to FIGS. 5 and 7, which may prevent the TFT pixels of the sensor array from storing voltages responsive to signals from the piezoelectric receiver layer 316 in response to reflected ultrasonic waves, as described further below. The TFT pixels may be biased using the receiver bias voltage when the bias voltage has a first value that causes the TFT pixels of the sensor array to operate according to a ready mode of operation. The first value may correspond to the hold mode described with reference to FIG. 7.

The method 900 may further include initiating an ultrasonic sensing operation at the integrated circuit, at 904. The receiver bias voltage may be adjusted to a second value that causes the TFT pixels to operate according to a block mode of operation, at 906. For example, the second value may correspond to the block mode described with reference to FIG. 7. A first signal may be provided from the integrated circuit to the sensor array, at 908. The first signal may correspond to the high voltage burst described with reference to FIG. 6, which may drive the ultrasonic transmitter 108 to generate an ultrasonic wave.

At 910, the receiver bias voltage may be adjusted to a third value that causes the TFT pixels to operate according to a sample mode of operation. The third value may correspond to the sample mode described with reference to FIG. 7. The method 900 may further include receiving a second signal from the sensor array, at 912. The second signal may be generated in response to a reflection of an ultrasonic wave, such as the first reflection of the ultrasonic wave described with reference to FIG. 7. For example, the ultrasonic wave may be generated at the piezoelectric transmitter layer 314 in response to the first signal. The second signal may correspond to voltages that are generated by the TFT sensor pixels and the piezoelectric receiver layer 316 in response to the reflection of the ultrasonic wave. The method 900 may further include adjusting the receiver bias voltage to the second value after the second signal is received from the sensor array, at 914. The receiver bias voltage may be adjusted to the second value to reduce or prevent reception of a bounce of the reflection of the ultrasonic wave at the TFT pixels (e.g., to keep the TFT pixels from storing voltages responsive to unwanted signals that may occur at the piezoelectric receiver layer 316). The bounce after the reflection may correspond to one or more of the multiple bounces described with reference to FIG. 7.

Because the receiver bias voltage has the value associated with the block mode during the main burst of the ultrasonic wave, and because the receiver bias voltage has the sample value during the first reflection of the ultrasonic wave, reception of the first reflection of the ultrasonic wave is enabled and reception of the main burst of the ultrasonic wave is inhibited. Further, as illustrated in FIG. 9, the receiver bias voltage may have the block value while additional bounces of the reflection are generated, thus reducing or preventing reception of bounces after the first reflection of the ultrasonic wave.

Figure 10:
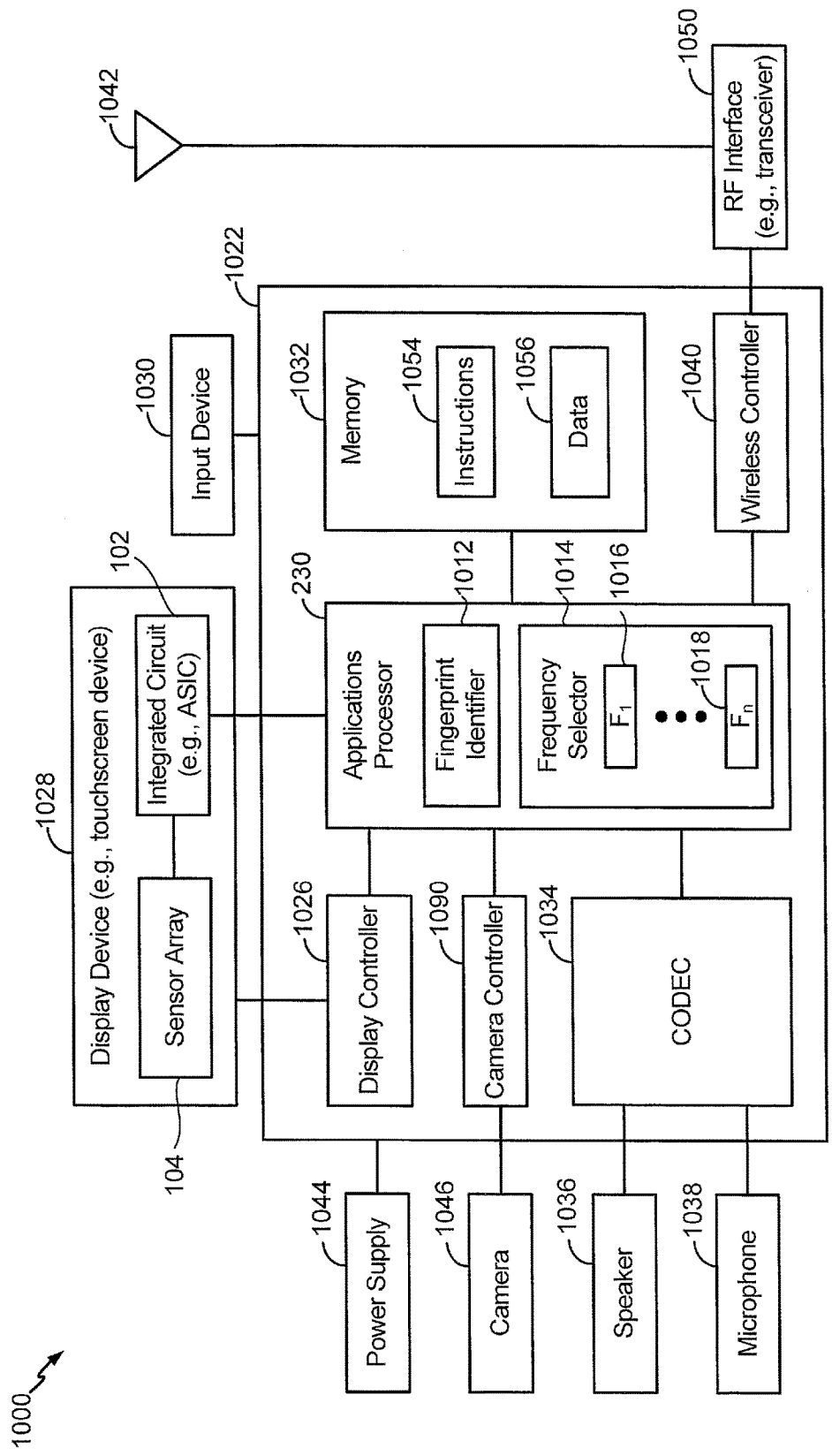
FIG. 10 is a diagram of a particular illustrative embodiment of a mobile device that includes an integrated circuit, such as the integrated circuit of FIG. 1, configured to operate a sensor array.

Referring to FIG. 10, a block diagram of a particular illustrative embodiment of a mobile device is depicted and generally designated 1000. The mobile system 1000 may include a processor, such as the applications processor 230 of FIG. 2. In the particular example of FIG. 10, the applications processor 230 includes a fingerprint identifier 1012 and a frequency selector 1014. Alternatively, the applications processor 230 may include an ultrasonic touchpad identifier or an ultrasonic touchscreen identifier (not shown).

The applications processor 230 may be coupled to a computer-readable medium, such as to a memory 1032 (e.g., a non-transitory computer-readable medium). The memory 1032 may store instructions 1054 executable by the applications processor 230 and data 1056 usable by the applications processor 230.

FIG. 10 also shows a display controller 1026 that is coupled to the applications processor 230 and to a display device 1028 (e.g., a touchscreen device). In the example of FIG. 10, the display device 1028 includes the integrated circuit 102 and the sensor array 104 of FIG. 1. According to other embodiments, the integrated circuit and/or the sensor array 104 may be positioned elsewhere at the mobile system 1000. For example, the mobile device 1000 may include dedicated fingerprint sensors separated from the display device 1028. Thus, the display device 1028 may act as a display and as an ultrasonic sensor system to transmit an ultrasonic burst, to receive a reflection of the ultrasonic burst, and to provide information (e.g., on a pixel-by-pixel basis) related to objects positioned near or on the display device 1028 based on the reflected ultrasonic burst. In other embodiments, the display device 1028 may include a capacitive touchscreen, with a portion of the touchscreen or a region near the touchscreen having an ultrasonic sensor array that may be used for touch, stylus or fingerprint detection.

A coder/decoder (CODEC) 1034 can also be coupled to the applications processor 230. A speaker 1036 and a microphone 1038 can be coupled to the CODEC 1034. The mobile system 1000 may include a camera. For example, FIG. 10 depicts that a camera 1046 may be coupled to a camera controller 1090. The camera controller 1090 may be coupled to the applications processor 230. FIG. 10 also indicates that a wireless controller 1040 can be coupled to the applications processor 230. The wireless controller 1040 may be further coupled to an antenna 1042 via a radio frequency (RF) interface 1050.

In a particular embodiment, the applications processor 230, the memory 1032, the display controller 1026, the camera controller 1090, the CODEC 1034, the wireless controller 1040, and the RF interface 1050 are included in a system-in-package or system-on-chip device 1022. An input device 1030 and a power supply 1044 may be coupled to the system-on-chip device 1022. Moreover, in a particular embodiment, and as illustrated in FIG. 10, the display device 1028, the input device 1030, the camera 1046, the speaker 1036, the microphone 1038, the antenna 1042, and the power supply 1044 are external to the system-on-chip device 1022. However, each of the display device 1028, the input device 1030, the camera 1046, the speaker 1036, the microphone 1038, the antenna 1042, and the power supply 1044 can be coupled to a component of the system-on-chip device 1022, such as to an interface or to a controller.

In operation, the applications processor 230 may receive data samples from the integrated circuit 102. The data samples may correspond to measurements of a reflected ultrasonic wave of a particular frequency that is generated by the sensor array 104. The data samples may be provided from the integrated circuit 102 to the applications processor 230 on a "per-row" basis, as described with reference to FIG. 5.

In response to receiving the data samples from the integrated circuit 102, the applications processor 230 may analyze a metric associated with data samples. In a particular embodiment, the applications processor is configured to analyze a signal-to-noise ratio (SNR) associated with the data samples. If the SNR satisfies a threshold (e.g., has a value that is above a predetermined threshold SNR), then the applications processor 230 may send a signal to the integrated circuit 102 that indicates that the integrated circuit 102 is to maintain operation of the sensor array 104 at the particular transmitter excitation frequency. Further, the applications processor 230 may utilize the fingerprint identifier 1012 to identify and/or recognize a fingerprint associated with the data samples (e.g., in order to authenticate a user of the mobile system 1000).

If the SNR does not satisfy the threshold (e.g., has a value that is less than a predetermined threshold SNR), then the applications processor 230 may utilize the frequency selector 1014 to determine another frequency at which the sensor array 104 is to be operated. For example, the applications processor 230 may select a first frequency 1016 or an nth frequency 1018. The applications processor 230 may send a response to the integrated circuit 102 to instruct the integrated circuit to begin operating the sensor array 104 according to the first frequency 1016 and/or the nth frequency 1018 and to provide data samples based on the updated frequency of operation.

In response, the integrated circuit may operate the sensor array 104 according to the updated frequency (e.g., may cause the sensor array 104 to generate an ultrasonic wave at the selected frequency). In a particular embodiment, the applications processor 230 analyzes a transfer function characteristic of the sensor array 104. For example, the applications processor 230 may attempt to determine a frequency that corresponds to a "peak" region of a transfer function characteristic of the sensor array 104 (e.g., in order to increase the SNR associated with measured data samples). The transfer function may represent the magnitude of the signal from the TFT pixels over a range of transmitter driver frequencies. Depending in part on the thickness, area, and dielectric constants of the ultrasonic transmitter and the piezoelectric receiver layer, a local peak may be obtained within a frequency range of interest, such as between about 5 MHz and about 20 MHz.

Because the integrated circuit 102 controls operations associated with the sensor array 104, processing resources at the applications processor 230 may be freed. Further, because the integrated circuit 102 includes components that may be implemented using discrete components, design and/or manufacture of the mobile device 1000 may be simplified and more compact as compared to devices with many discrete components.

Although the particular example of FIG. 10 is described with reference to fingerprint identification, it should be appreciated that other configurations are within the scope of the disclosure. For example, those of skill in the art will recognize that in connection with the described embodiments, ultrasound waves can be transmitted and reflected from a stylus (e.g., a stylus used by a user to indicate one or more operations). Alternatively or in addition, ultrasound waves can be transmitted and reflected based on a "user touch" operation. As used herein, a user touch operation may include a user contacting a display surface (e.g., of the display device 1028) to indicate one or more operations. For example, a user touch operation may indicate a selection operation (e.g., a "click"), a zoom operation, a "long press" operation (e.g., touching a portion of a touchscreen for a particular time duration, such as in order to select or delete text and/or icons), or a combination thereof.

In connection with the described embodiments, a computer-readable medium (e.g., the memory 1032) stores instructions (e.g., the instructions 1054) that are executable by the integrated circuit 102, the applications processor 230, or a combination thereof, to perform one or more operations described herein. The operations may include providing a first signal from the integrated circuit 102 to the sensor array 104 and receiving a second signal from the sensor array 104. The second signal may be generated in response to a reflection of an ultrasonic wave. The ultrasonic wave is generated at the sensor array 104 in response to the first signal. The sensor array includes means for generating (e.g., the ultrasonic transmitter 108) configured to generate the ultrasonic wave in response to the first signal and means for detecting (e.g., the piezoelectric receiver layer 316) the reflection of the ultrasonic wave. The reflection of the ultrasonic wave is reflected from a fingertip of a user.

In connection with the described embodiments, an apparatus includes an integrated circuit configured to be operatively coupled to a sensor array that is configured to generate an ultrasonic wave. The integrated circuit may correspond to the integrated circuit 102. The sensor array may correspond to the sensor array 104. The integrated circuit includes means for providing a first signal to the sensor array (e.g., the data interface 404, which may include one or more input terminals of the integrated circuit). The integrated circuit further includes means for receiving a second signal from the sensor array in response to providing the first signal (e.g., the transmitter driver interface 426, which may correspond to one or more output terminals of the integrated circuit). The sensor array includes an ultrasonic transmitter (e.g., the ultrasonic transmitter 108) configured to generate the ultrasonic wave in response to the first signal and a piezoelectric receiver layer (e.g., the piezoelectric receiver layer 316) configured to detect a reflection of the ultrasonic wave. The reflection of the ultrasonic wave is reflected from a fingertip of a user.

Those of skill in the art will appreciate that the foregoing disclosed devices and functionalities may be designed and configured into computer files (e.g., RTL, GDSII, GERBER, etc.) stored on computer-readable media. Some or all such files may be provided to fabrication handlers who fabricate devices based on such files. Resulting products include semiconductor wafers that are separated into semiconductor dies and packaged into semiconductor chips, such as the integrated circuit 102 of FIG. 1. The semiconductor chips may then be employed or otherwise integrated or included within devices, such as within the mobile device or mobile system 1000 of FIG. 10. The integrated circuit 102 may be configured to read a sensor array having pixels arranged in rows and columns. The number of rows and columns may range from just a few, corresponding to one or more ultrasonic buttons or a small sensor array, to thousands or more in each row or column, corresponding to multiple-finger or palm-print readers, or to ultrasonic touchpads or ultrasonic touch screens. A wake-up or power-up detection circuit may be provided with the ultrasonic sensor controller that detects single taps or a sequence of taps on the ultrasonic sensor array and generates a signal, for example, to wake up a mobile device. The sequence of taps may represent a password or code to limit access to the mobile device.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory medium is coupled to the processor such that the processor can read information from, and write information to, the storage medium. In the alternative, the storage medium may be integral to the processor. The processor and the storage medium may reside in an application-specific integrated circuit (ASIC) and/or a field programmable gate array (FPGA) chip. The ASIC and/or FPGA chip may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus comprising:
a transmitter circuit configured to provide a first signal to a sensor array, wherein the sensor array includes an ultrasonic transmitter configured to generate an ultrasonic wave in response to the first signal and includes a receiver layer configured to detect a reflection of the ultrasonic wave, the receiver layer including a plurality of transistors;
a receiver circuit configured to receive a second signal from a transistor of the plurality of transistors in response to the first signal; and
a third circuit configured to bias the transistor using a first voltage associated with generation of the ultrasonic wave, the third circuit further configured to bias the transistor using a second voltage that is distinct from the first voltage to cause the transistor to generate the second signal in response to the reflection of the ultrasonic wave, the third circuit further configured to bias the transistor using a third voltage that is distinct from the first voltage and the second voltage to cause the transistor to provide the second signal to the receiver circuit, wherein the first voltage is greater than the third voltage, and wherein the third voltage is greater than the second voltage.

2. The apparatus of claim 1, wherein the transmitter circuit includes a resonator circuit configured to generate the first signal.

3. The apparatus of claim 2, further comprising an H-bridge circuit coupled to the resonator circuit and configured to provide an output voltage to the resonator circuit to cause the resonator circuit to generate the first signal.

4. The apparatus of claim 3, wherein the resonator circuit is further configured to resonate at a frequency based on the output voltage.

5. The apparatus of claim 3, further comprising a boost circuit coupled to the H-bridge circuit and configured to provide a boost signal to the H-bridge circuit to cause the H-bridge circuit to generate the output voltage.

6. The apparatus of claim 1, further comprising the sensor array, wherein the sensor array includes the receiver layer, the receiver layer including a piezoelectric material configured to generate a surface charge based on the reflection of the ultrasonic wave.

7. The apparatus of claim 1, wherein the receiver circuit comprises selection logic configured to select samples from the sensor array.

8. The apparatus of claim 7, wherein the receiver circuit includes a memory configured to buffer the samples, and further comprising a processor interface configured to output the samples to a processor.

9. The apparatus of claim 8, wherein the processor interface includes a serial peripheral interface.

10. The apparatus of claim 1, wherein the plurality of transistors include thin film transistor (TFTs), and wherein each transistor of the plurality of transistors corresponds to a different region of the sensor array.

11. An apparatus comprising:
means for providing a first signal to means for sensing an ultrasonic signal, wherein the means for sensing the ultrasonic signal includes means for generating an ultrasonic wave in response to the first signal and includes means for detecting a reflection of the ultrasonic wave;
means for receiving a second signal from the means for sensing the ultrasonic signal in response to providing the first signal; and
means for biasing the means for detecting the reflection of the ultrasonic wave using a first voltage associated with generation of the ultrasonic wave, using a second voltage that is distinct from the first voltage to cause the means for detecting to generate the second signal in response to the reflection of the ultrasonic wave, and using a third voltage that is distinct from the first voltage and the second voltage to cause the means for detecting to provide the second signal to the means for receiving, wherein the first voltage is greater than the third voltage, and wherein the third voltage is greater than the second voltage, wherein the means for sensing the ultrasonic signal is included in a first integrated circuit, and wherein the means for providing the first signal to the means for sensing the ultrasonic signal, the means for receiving the second signal from the means for sensing the ultrasonic signal, and the means for biasing the means for detecting the reflection of the ultrasonic wave are included in a second integrated circuit that is distinct from and in communication with an application processor.

12. The apparatus of claim 11, further comprising the means for sensing the ultrasonic signal, wherein the means for receiving the second signal is distinct from the means for sensing the ultrasonic signal.

13. The apparatus of claim 11, further comprising:
means for converting the reflection of the ultrasonic wave to a digital signal; and
means for processing the digital signal.

14. A method comprising:
generating a first voltage, at a biasing circuit, to bias at least one of a plurality of transistors of a sensor array;
providing a first signal to the sensor array to cause an ultrasonic transmitter of the sensor array to generate an ultrasonic wave;
generating a second voltage, at the biasing circuit, to cause the at least one of the plurality of transistors to generate a second signal in response to a reflection of the ultrasonic wave, the second voltage distinct from the first voltage;
generating a third voltage, at the biasing circuit, to bias the at least one of the plurality of transistors to cause the at least one of the plurality of transistors to provide the second signal to a receiver circuit, the third voltage distinct from the first voltage and the second voltage, wherein the first voltage is greater than the third voltage, and wherein the third voltage is greater than the second voltage; and
receiving the second signal, at the receiver circuit, from the sensor array based on the reflection of the ultrasonic wave.

15. The method of claim 14, wherein the first voltage is provided to the at least one of the plurality of transistors during a hold mode of operation to inhibit the at least one of the plurality of transistors from receiving the ultrasonic wave, and wherein the second voltage is provided to the at least one of the plurality of transistors during a sample mode of operation.

16. The method of claim 14, further comprising, after generating the second signal, transitioning an output of the biasing circuit from the second voltage to the first voltage to inhibit reception of a bounce of the reflection of the ultrasonic wave.

\* \* \* \* \*